United States Patent [19]

Fletcher et al.

[11] 3,905,660

[45] Sept. 16, 1975

[54] DRILLED BALL BEARING WITH A ONE PIECE ANTI-TIPPING CAGE ASSEMBLY

[75] Inventors: James C. Fletcher, Administrator of the National Aeronautics and Space Administration, with respect to an invention of Arthur S. Irwin, Bemus Point, N.Y.

[73] Assignee: The United States Government as represented by the National Aeronautics and Space Administration Office of General Counsel, Code GP, Washington, D.C.

[22] Filed: Mar. 12, 1974

[21] Appl. No.: 450,505

[52] U.S. Cl. ............... 308/191; 308/195; 308/201
[51] Int. Cl.² .......................................... F16C 33/32
[58] Field of Search ........... 308/191, 195, 188, 201, 308/212; 29/148.4, 149.5, 201

[56] References Cited
UNITED STATES PATENTS
1,766,440  6/1930  Leon................................... 308/194
3,620,585  11/1971  Anderson et al. .................. 308/195

*Primary Examiner*—M. Henson Wood, Jr.
*Assistant Examiner*—Richard A. Bertsch
*Attorney, Agent, or Firm*—N. T. Musial; G. E. Shook; J. R. Manning

[57] ABSTRACT

A drilled ball bearing is disclosed which has a pair of projections machined or otherwise formed from the inner surface of each of the cage pockets. These projections prevent misorientation of the openings of the drilled passages of the balls with respect to the surfaces of the inner and outer races. The machining of the projections from the inner surface of each of the cage pockets forms a unitary one piece structure which has improved resistance to fragmentation caused by either thermal or vibrational effects when compared to conventional two piece anti-tipping cage assemblies.

1 Claim, 3 Drawing Figures

DRILLED BALL BEARING WITH A ONE PIECE ANTI-TIPPING CAGE ASSEMBLY

ORIGIN OF THE INVENTION

The invention described herein was made in the performance of work under a NASA contract and is subject to the provision of Section 305 of the National Aeronautics and Space Act of 1958, Public Law 85–568 (72 Stat. 435; 42 USC 4257).

BACKGROUND OF THE INVENTION

Special ball bearing assemblies have been developed for high speed applications such as used in jet engine mainshafts wherein speeds above 3 million DN (product of bearing bore diameter in mm times shaft speed in r.p.m.) are characteristically found. At these high speeds large centrifugal forces are exerted against the inner surface of the outer race because of the rapid rotation of the cage and balls about the axis of the bore of the bearing. The resultant buildup of heat and metal fatigue often causes the outer race of the bearing to fail.

Drilled ball bearings were developed as one solution of the aforementioned problem. Each of the balls of a drilled ball bearing has a hollow cylindrical section which has its axis running diametrically through the center of the ball. The removal of ball material from within the drilled passages lessens the mass of the ball and results in a concomitant reduction in the centrifugal force exerted on the inner surface of the outer race during high speed operation. However, if the drilled balls are placed within cage pockets without apparatus for preventing surface contact between the edge of the openings of the drilled passages and the surfaces of the races, each drilled ball would roll freely "end over end" causing destruction of the smooth surfaces of the races.

The prior art apparatus for preventing free rolling of the balls within the cage pockets includes:

1. Pegs in the sides of the cage which extended axially into the ball pockets (U.S. Pat. No. 3,620,585);
2. Circumferential wires welded into the pocket area of the cage; and
3. Annular rings interference fit into the cage in the pocket area.

All of the aforementioned types of apparatus for preventing free rolling of the drilled balls within the cage pockets suffer from the serious disadvantage of being two piece assemblies. Because of high temperatures and vibrations encountered in drilled ball bearing applications, two piece assemblies present problems of potential disassembly during operation which would not be found in one piece assemblies.

SUMMARY OF THE DISCLOSURE:

The disadvantages and limitations of prior art anti-tipping cage assemblies for preventing free rolling of the drilled balls within the cage pockets are solved by the instant invention which comprises a one-piece unitary structure machined or otherwise formed from the inner surface of each of the cage pockets. In terms of the specification and the appended claims the terminology "one piece unitary structure" is meant to define a structure which is formed from a single piece of material which requires no assembly of parts.

The one piece unitary structure of the anti-tipping apparatus of the instant invention comprises a pair of projections which are machined from the inner surface of each of the cage pockets. Each projection has a pair of surfaces which meet in an apex. When the drilled balls assume a particular angular orientation with respect to the cage pocket, one of the surfaces of each projection contacts the edge of one of the openings of the drilled passage of each of the balls to prevent the rotation of the edge of the opening past the surface of the projection.

Figure 1:
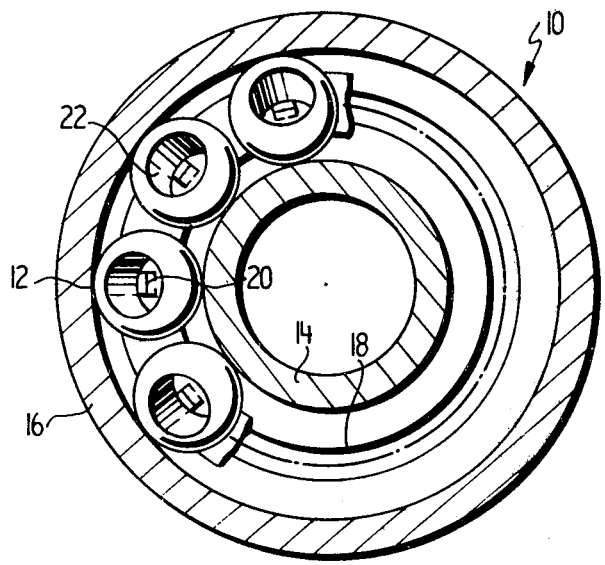
FIG. 1 is a diametrical section of a drilled ball bearing constructed according to the instant invention.

DETAILED DESCRIPTION OF THE INVENTION:

Referring to FIG. 1, a radial cross section 10 is shown of a drilled ball bearing constructed according to the invention which has a plurality of drilled balls 12 rotatably supporting inner race 14 and outer race 16. While four drilled balls 12 have been shown for illustrative purposes, it should be clear that any number may actually be used. Each of the drilled balls 12 is held in a cage pocket (Numeral 26 in FIG. 2) which is part of cage assembly 18. Within each cage pocket 26 there are a pair of projections 20 (only one projection has been shown in FIG. 1 for each cage pocket) which extend from the inner surface thereof to touch the outer edge of the drilled passage 22 of each ball when the ball 12 has a given angular orientation. Each drilled passage 22 extends diametrically through the ball to effectively lessen its mass and thereby lessen the centrifugal force exerted by the balls on the inner surface of the outer race during high speed operation.

Figure 2:
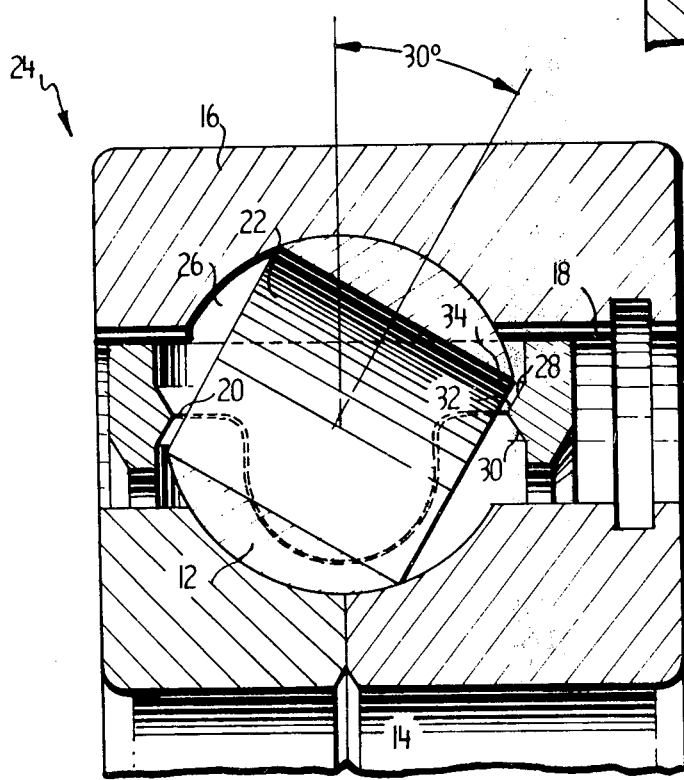
FIG. 2 is a vertical view of a single cage pocket constructed according to the instant invention.

Referring to FIG. 2, a detailed vertical section 24 is shown of a single cage pocket 26 of a drilled ball bearing constructed according to the invention. Each projection 20 is machined or otherwise formed out of the material from which cage 18 is constructed to form a one piece unitary structure which is an integral part of the cage 18. Each projection 20 has pair of surfaces 28 and 30 which meet in an apex 32 to form an edge. During rotation, each of the balls 12 freely rolls within cage pocket 26. When the drilled ball 12 assumes a given angular orientation, one of the surfaces 28 or 30 of each projection 20 contacts drilled ball 12 at the edge of the opening 34 of passage 22 to prevent rotation of the planar surface defined by the opening 34 of passage 22 past an angular orientation substantially parallel to one of the surfaces 26 or 28. As shown in FIG. 2, the preferred maximum permissible static angulanation orientation measured from the vertical is 30°.

Figure 3:
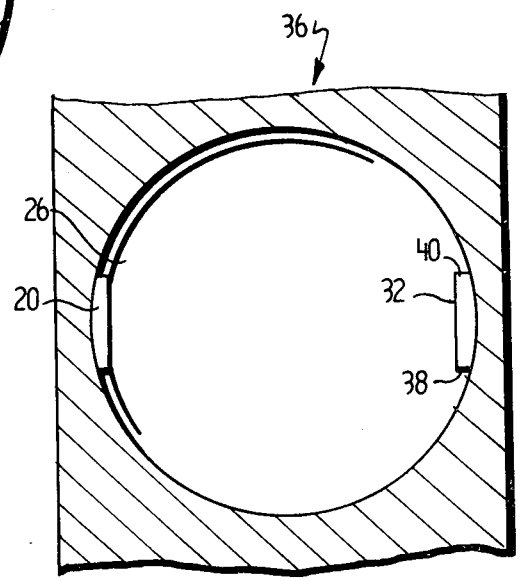
FIG. 3 is a top section of a single cage pocket constructed according to the instant invention.

FIG. 3 shows a top view 36 of a single cage pocket 26 constructed according to the invention. Projections 20 extend from the inner surface of cage pocket 26 to form two right angles 38 and 40 with edge 32.

It will be apparent to those skilled in the art to which the invention pertains that the invention may be practiced otherwise than as specifically described herein. For instance, projections 20 may have numerous other shapes as long as they form a one piece unitary structure with cage 18 which prevents "free rolling" of the drilled balls within cage pocket 26.

What is claimed as new and desired to be secured by Letters Patent of the United States is:

1. In a drilled ball bearing assembly of the type having a circular cage interposed between inner and outer races for mounting a plurality of drilled balls in spaced relationship for rotation as the inner race revolves relative to the outer race and said races contact said balls, the combination comprising:
   a passage extending diametrically through each ball, said passage defining a pair of diametrically opposed openings each having an edge on the outer surface of said ball, and
   a pair of oppositely disposed projections adjacent to said openings extending toward each of said drilled balls from the inner surface of said cage, said projections and said cage comprising a one-piece unitary structure formed from the material from which said cage is constructed, each of said projections comprising,
   a pair of surfaces projecting from the inner surface of said cage and meeting in an apex to form an edge so that when said drilled ball assumes a given angular orientation the rotation of said edge of each of said openings past the point of contact of said edge with said surface is prevented, and
   oppositely disposed end surfaces of each of said projections forming right angles to said edge.

* * * * *